(12) United States Patent
Esakki et al.

(10) Patent No.: US 10,955,263 B2
(45) Date of Patent: Mar. 23, 2021

(54) APPARATUSES, SYSTEMS, AND METHODS FOR IMPROVED SENSOR DEVICES

(71) Applicant: Honeywell International Inc., Morris Plains, NJ (US)

(72) Inventors: Subramanian Esakki, Bangalore (IN); Aaron Daniels, Echo, MI (US); Vijayshekhar Araganji, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 57 days.

(21) Appl. No.: 16/388,073

(22) Filed: Apr. 18, 2019

(65) Prior Publication Data

US 2020/0333168 A1    Oct. 22, 2020

(51) Int. Cl.
   *G01D 5/22*   (2006.01)
   *G01D 5/20*   (2006.01)
   *H01F 21/06*  (2006.01)
   *H01F 27/32*  (2006.01)

(52) U.S. Cl.
   CPC .......... *G01D 5/2291* (2013.01); *G01D 5/204* (2013.01); *H01F 21/06* (2013.01); *H01F 27/325* (2013.01)

(58) Field of Classification Search
   None
   See application file for complete search history.

(56) References Cited

U.S. PATENT DOCUMENTS

| | | | |
|---|---|---|---|
| 5,061,896 A | * | 10/1991 | Schmidt ............... G01D 5/2046 324/207.18 |
| 2002/0035423 A1 | | 3/2002 | Shank et al. |
| 2015/0145507 A1 | | 5/2015 | Deshmukh et al. |
| 2015/0354991 A1 | | 12/2015 | Graf et al. |
| 2016/0033306 A1 | | 2/2016 | Hubbell |
| 2016/0334245 A1 | | 11/2016 | Esakki et al. |

OTHER PUBLICATIONS

Extended European Search Report for Patent Application No. 20168099.8 dated Sep. 11, 2020, 9 pages.

* cited by examiner

*Primary Examiner* — Jas A Sanghera
(74) *Attorney, Agent, or Firm* — Alston & Bird LLP

(57) ABSTRACT

Apparatuses, systems, and associated methods of assembly are described that provide for improved sensor devices. An example sensor device includes a bobbin tube that defines a hollow interior. The device includes a primary coil element wound around the bobbin tube configured to, in response to a current input, generate a primary magnetic flux and includes a secondary coil element wound around the primary coil element. In an instance in which the bobbin tube receives a probe assembly therein, magnetic interaction between the probe assembly and the primary coil element is configured to induce a signal in the secondary coil element. Furthermore, a pitch of the secondary coil element varies according to a non-linear, polynomial function along a second length of the bobbin tube so as to reduce linearity error of the sensor device.

20 Claims, 11 Drawing Sheets

APPARATUSES, SYSTEMS, AND METHODS FOR IMPROVED SENSOR DEVICES

TECHNOLOGICAL FIELD

Example embodiments of the present invention relate generally to sensor assemblies and, more particularly, to improving the operation of sensor devices.

BACKGROUND

Sensor assemblies, such as a Linear Variable Differential Transformer (LVDT), may be used to convert between mechanical motion (e.g., vibration, strain, force, linear motion, etc.) and electrical signals (e.g., current, voltage, etc.). These sensors may be used in hydraulic applications, engine systems, automated teller machines (ATMs), aerospace applications, and a variety of other environments in which conversion between mechanical motion and electrical signals is needed. In these applications, such as in an engine control system, the sensor system may be exposed to strain, vibrational loads, or other forces that may damage the sensor system.

BRIEF SUMMARY

Systems, apparatuses, and methods are disclosed herein for providing improved sensor device operation. An example sensor device may include a bobbin tube that defines a hollow interior configured to receive a probe assembly inserted therein. The device may include a primary coil element wound around the bobbin tube configured to, in response to a current input, generate a primary magnetic flux and may include a secondary coil element wound around the primary coil element. In an instance in which the bobbin tube receives a probe assembly therein, magnetic interaction between the probe assembly and the primary coil element may induce a signal in the secondary coil element. Furthermore, a pitch of the secondary coil element may vary according to a non-linear, polynomial function along a second length of the bobbin tube so as to reduce linearity error of the sensor device.

In some embodiments, a pitch of the primary coil element may be uniform along a first length of the bobbin tube. In such an embodiment, the first length and the second length may be equal.

In other embodiments, the secondary coil element may further define a plurality of winding sections where the pitch of each winding section of the secondary coil element varies according to the non-linear, polynomial function along its respective length of the bobbin tube. In such an embodiment, the secondary coil element may further define a plurality of coil transition portions between winding sections. Each coil transition portion may be configured to minimize pitch variability between adjacent winding sections.

In some embodiments, the sensor device may further include one or more insulating tape layers wrapped around the secondary coil element. In other embodiments, the sensor device may include one or more wires operably coupled to the primary coil element and configured to provide the current input to the primary coil element. In any embodiment of the present disclosure, the signal in the secondary coil element may indicate a relative movement of the probe assembly within the bobbin tube.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The sensor assembly and sensor device described and illustrated herein may refer to a LVDT system as an example application. As would be evident to one of ordinary skill in the art in light of the present disclosure, the apparatuses, systems, and methods described herein regarding coil winding to provide improved sensor device operation may be equally applicable to sensor systems of all types, configurations, sizes, and the like. Said differently, the description herein should not be read as to only relate to LVDT applications.

Figures 1A, 1B:
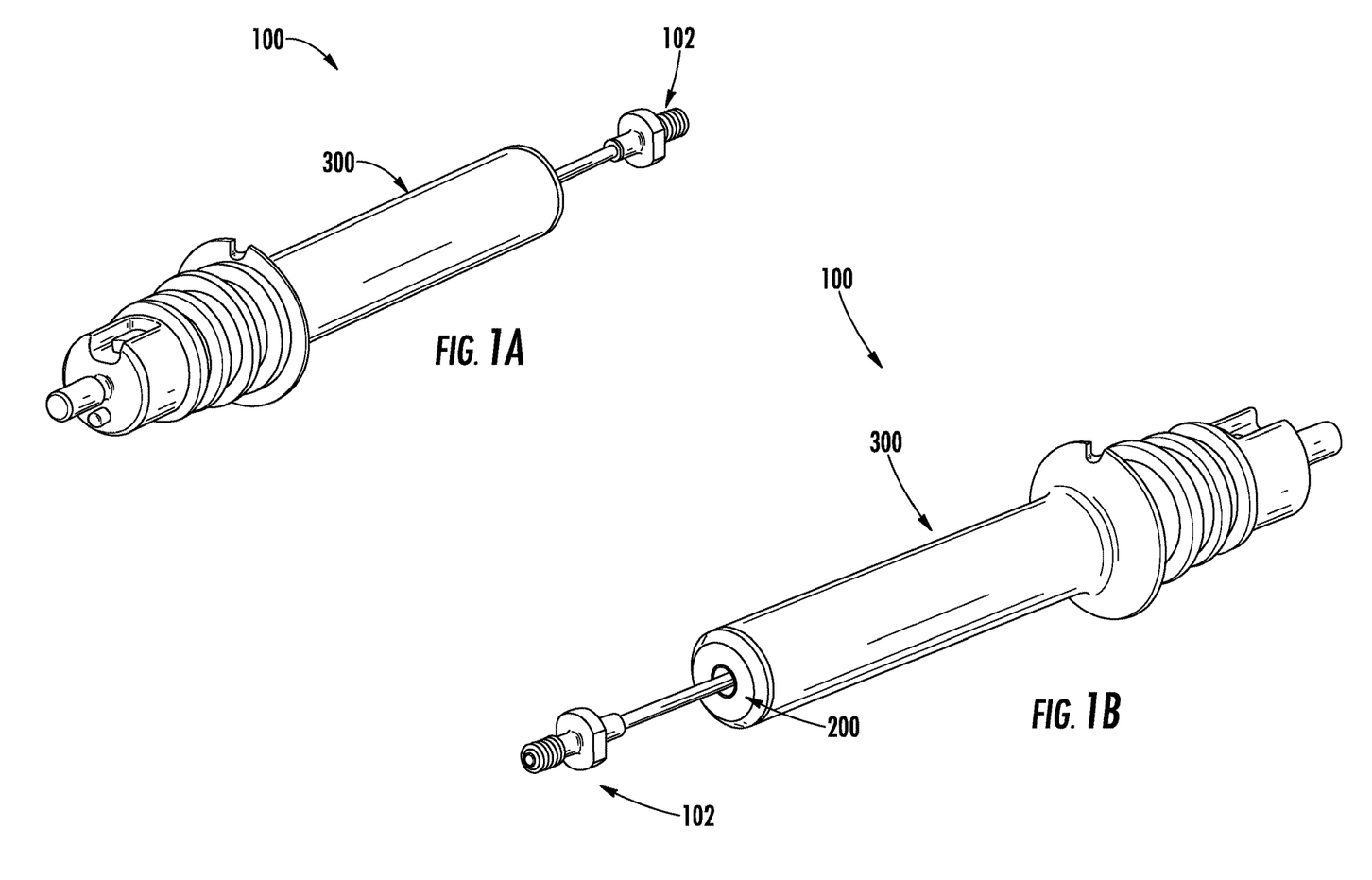
FIGS. 1A-1B are perspective views of an assembled sensor assembly according to an example embodiment.
Figure 2:
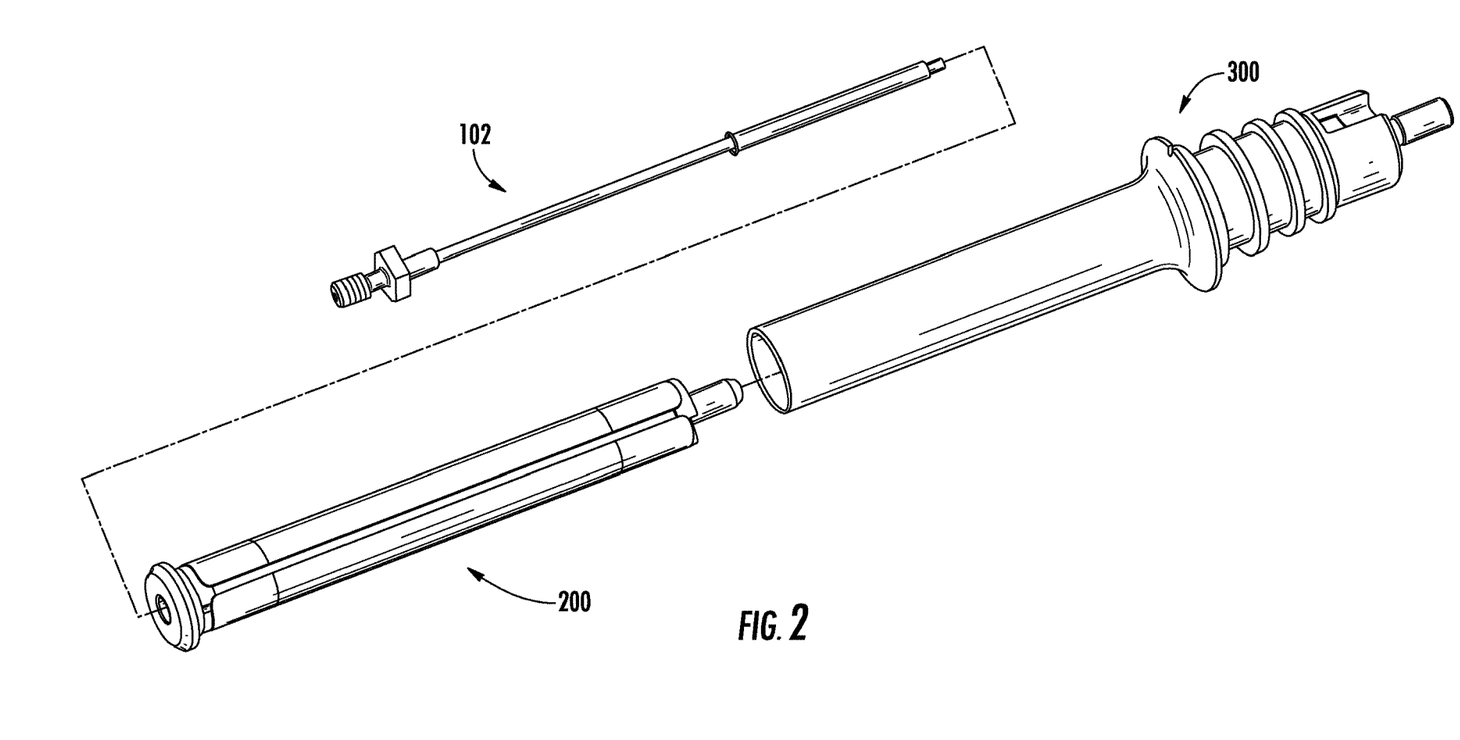
FIG. 2 is an exploded view of the sensor assembly of FIG. 1 according to an example embodiment.

With reference to FIGS. 1A-1B, perspective views of an assembled sensor assembly 100 of the present disclosure are illustrated. As shown, the sensor assembly 100 may include a housing 300, a probe assembly 102, and a sensor device 200. The probe assembly 102, described hereafter with reference to FIGS. 4A-4B, may be received by the sensor device 200 and supported within a bobbin tube (e.g., bobbin tube 202 in FIGS. 3A-3B) of the sensor device 200. The sensor assembly 100 may further include a housing 300 configured to shield or otherwise protect the sensor device 200 and probe assembly 102 received therein. As described above, the sensor device 200 of the present application may be received within aerospace applications, engine compartments, and the like such that preventing damage to the sensor device 200 is necessary in order to ensure accurate operation (e.g., positional and directional data in an LVDT application) of the sensor device 200. As such, the housing 300 of the present application may be dimensioned (e.g., sized and shaped) and formed of any material so as to impart the necessary protection for the intended application of the sensor device 200. With reference to FIG. 2, an exploded view of the example sensor assembly 100 of FIG. 1 is illustrated. As shown, the probe assembly 102 may be received by (inserted within) the sensor device 200 (e.g., device 200), and the combined probe assembly 102 and the device 200 may be received by the housing 300 (e.g., inserted together within the housing 300).

Figure 3A:
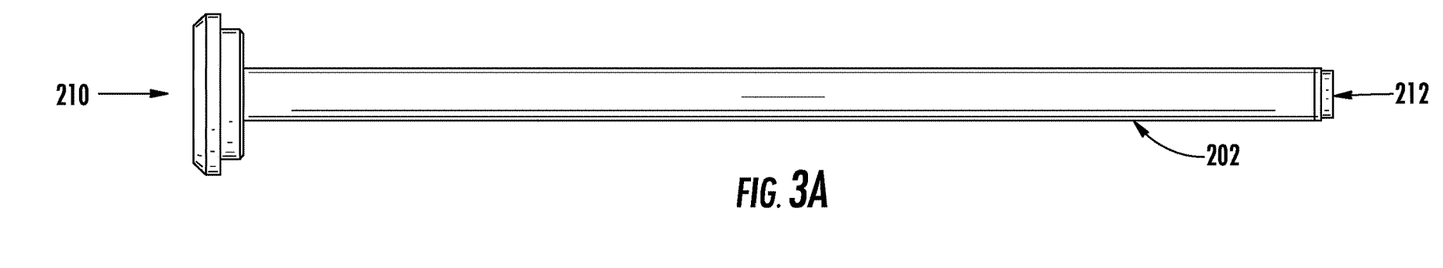
FIGS. 3A-3B are side views of a bobbin tube of FIG. 2 according to an example embodiment.
Figure 3B:
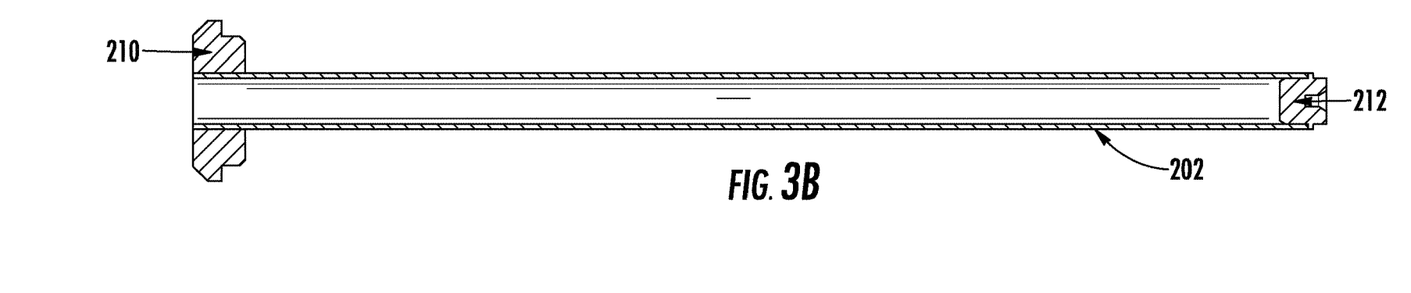

With reference to FIGS. 3A-3B, side views of a bobbin tube 202 of the device 200 are illustrated. As shown, the bobbin tube 202 may be defined as a hollow cylindrical element that includes a hollow interior. As described and shown above with reference to FIG. 1, the hollow interior of the bobbin tube 202 may be configured to receive a probe assembly (e.g., probe assembly 102) inserted therein. As would be evident to one of ordinary skill in the art in light of the present disclosure, the device 200 may be configured such that when the probe assembly is inserted therein, the probe is suspended within the bobbin tube 202. Said differently, the probe assembly may be secured (e.g., at a first end described hereafter) such that the portion of the probe assembly within the bobbin tube 202 does not contact the inside of the bobbin tube 202. While illustrated and described herein with reference to a cylindrical bobbin tube 202, the present disclosure contemplates that the bobbin tube 202 may be dimensioned (e.g., sized and shaped) for use with probe assemblies of any size, shape, or configuration.

Figures 4A, 4B:
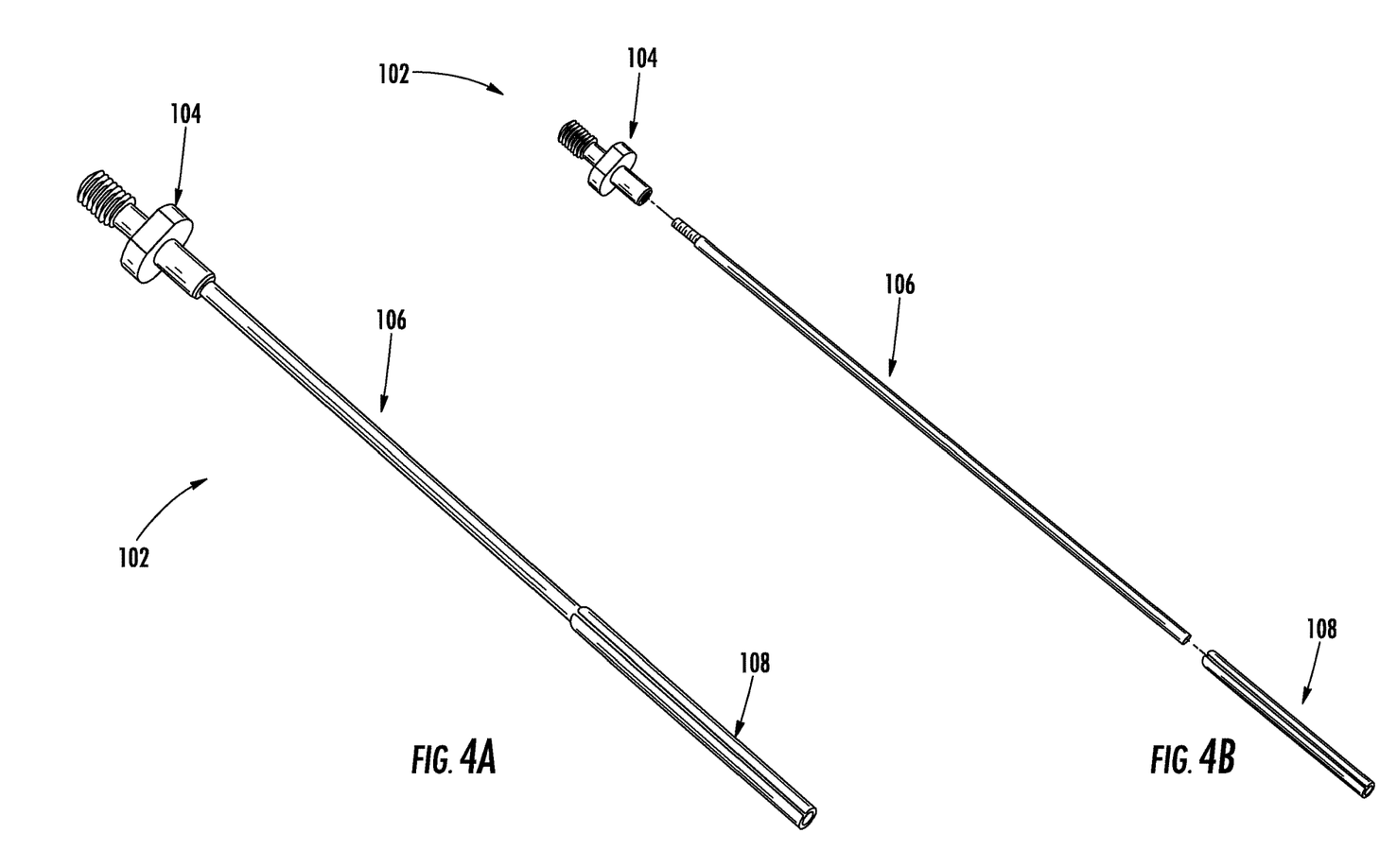
FIGS. 4A-4B are perspective views of an example probe assembly according to an example embodiment.

With continued reference to FIGS. 3A-3B, the device 200 may, in some embodiments, include a front fitting 210 and a bobbin plug 212. As shown, the front fitting 210 may be disposed on a first end of the bobbin tube 202 and may be configured to abut a portion of the probe assembly (e.g., probe assembly 102) inserted within the bobbin tube 202. As shown in FIGS. 4A-4B described hereafter, a fitting of the probe assembly (e.g., probe fitting 104) may abut the front fitting 210 and facilitate suspension of the probe assembly in the bobbin tube 202 as described above. The bobbin plug 212 may be disposed on a second end of the bobbin tube 202 opposite the first end, and the bobbin plug may be configured to seal the second end of the bobbin tube 202.

With reference to FIGS. 4A-4B, perspective views of an example probe assembly 102 are illustrated. As shown, the probe assembly may include a probe fitting 104, a probe rod 106, and a magnetic slug 108 (e.g., magnetic core). As would be evident to one of ordinary skill in the art in light of the present disclosure, movement of the magnetic slug's 108 position within the bobbin tube 202 may be determined via the differential voltage readings between the one or more coil elements (e.g., primary coil element 214, secondary coil element 216, or the like) transmitted via a wire harness 206 communicably coupled thereto. As described hereafter with reference to the winding of the primary coil element 214 and the secondary coil element 216, magnetic interaction between the probe assembly 102 and the primary coil element 214 may be configured to induce a signal in the secondary coil element 216. This signal in the secondary coil element 216 may indicate a relative movement of the probe assembly 102 within the bobbin tube 202. Said differently, the electrical signal of the secondary coil element 216 may include a phase that may correspond to a direction of the movement of the probe assembly 102 (e.g., movement direction of the magnetic slug 108) and an amplitude that may correspond to a distance of movement of the probe assembly 102.

Figure 5:
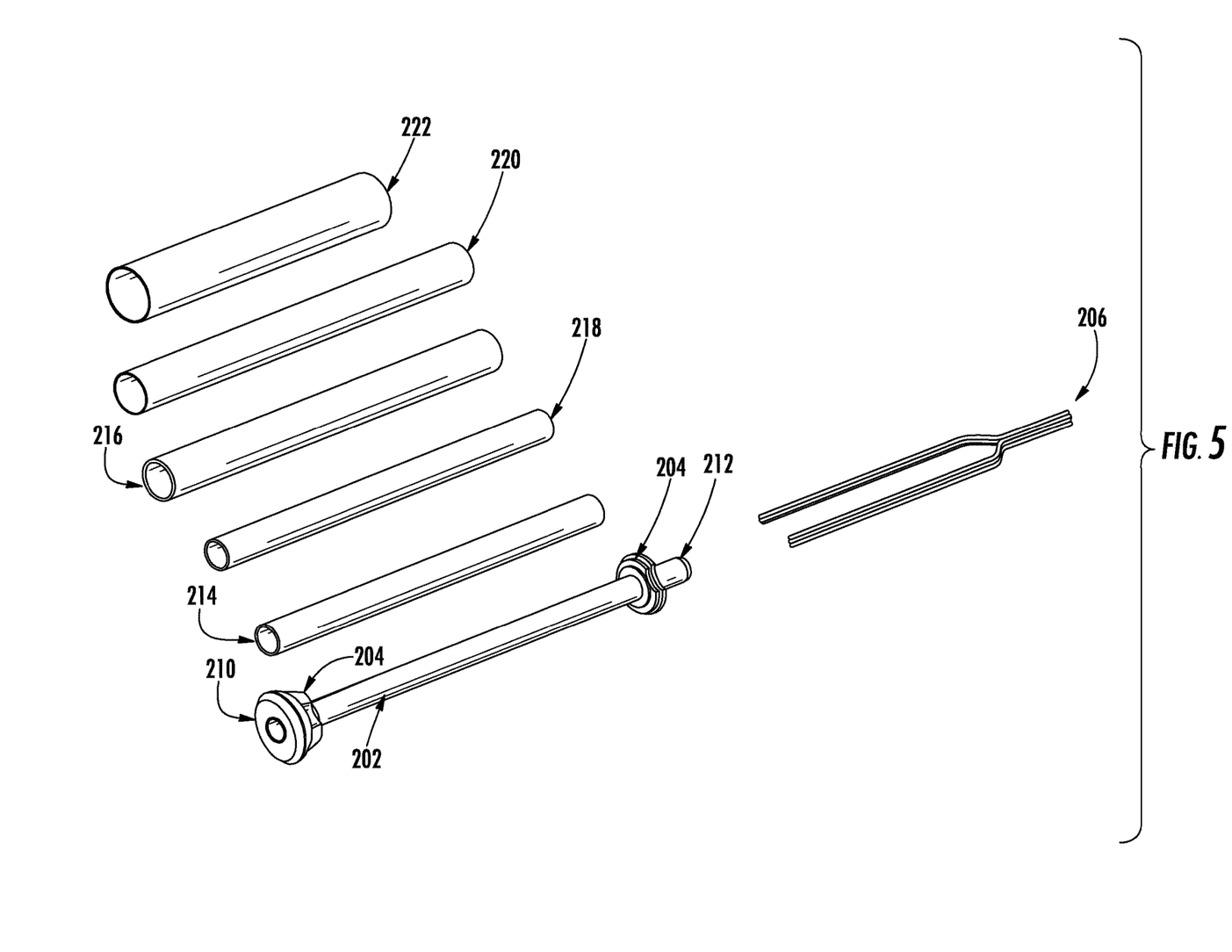
FIG. 5 is an exploded view of the sensor device of FIG. 2 according to an example embodiment.

With reference to FIG. 5, an exploded view of the sensor device 200 (e.g., device 200) is illustrated. As described above, the device 200 may include a bobbin tube 202 that defines a hollow interior configured to receive the probe assembly 102 inserted therein. The device 200 may further include one or more washers 204 and a wire harness 206 (e.g., comprising one or more wires). The device 200 may include one or more washers 204 (e.g., magnetic washers) that are attached around the bobbin tube 202, and, in some embodiments, the device 200 may include two (2) washers 204 that are located collinearly along a length of the bobbin tube 202. As would be evident to one of ordinary skill in the art, in some instances, the washers 204 may each be formed as single members such that each washer 204 is attached at an end of the bobbin tube 202 and translated along the length of the bobbin tube 202. In other embodiments, the washers 204 may be formed as modular components such that washers 204 may be snapped or otherwise attached to the bobbin tube 202 at any location along the length of the bobbin tube 202. While illustrated and described herein with reference to two (2) washers 204 (e.g., magnetic washers), the present disclosure contemplates that any number of washers 204 may be attached to the bobbin tube 202 at any location along the length of the bobbin tube 202.

With continued reference to FIG. 5, the device 200 may include a wire harness 206 that includes one or more wires (e.g., lead wires). The one or more wires of the wire harness 206 may be positioned via one or more wire notches of the one or more washers 204 (e.g., magnetic washers). The wires of the wire harness 206 are configured to be, when attached in the device 200, communicably coupled with the probe assembly (e.g., probe assembly 102) inserted in the bobbin tube 202 as well as the primary coil element 214 as described hereafter. As would be evident to one of ordinary skill in the art in light of the present disclosure, the wires of the wire harness 206 may be used to provide power to the probe assembly 102 inserted in the bobbin tube 202 as well as to transmit signals (e.g., output delivery signals) generated in response to movement of the probe assembly. Furthermore, the wires of the wire harness 206 may be configured to input a current (e.g., an alternating current (A/C)) to the primary coil element 214 such that the primary coil element 214 may generate a primary magnetic flux.

As shown in FIG. 5, the device 200 may further include one or more coil elements (e.g., a primary coil element 214 and a secondary coil element 216) that are wound around at least a portion of the bobbin tube 202. As would be evident to one of ordinary skill in the art, the one or more coil elements may be formed of a magnetic material so as to identify differential voltage readings caused by a movement of the probe assembly (e.g., probe assembly 102) within the bobbin tube 202. As shown in FIG. 5, the coil elements 214, 216 may surround at least a portion of the length the bobbin tube 202 and may, in some embodiments, span a length of the bobbin tube 202 between the washers 204 (e.g., magnetic washers). Furthermore, as shown in FIG. 5, the device 200 may include one or more insulating tape layers (e.g., a first tape layer 218, a second tape layer 220, and/or a third tape later 222) that are wrapped around one or more of the coil elements 214, 216. As would be evident to one of ordinary skill in the art in light of the present disclosure, the insulating tape layers 218, 220, 222 may operate to shield magnetic flux (e.g., insulate) the coil elements 214, 216 as well as between other elements of the device 200.

In an example embodiment shown in the exploded view of FIG. 5, the one or more coil elements further include a primary coil element 214 and a secondary coil element 216. In such an embodiment, the primary coil element 214 may be wound around the bobbin tube 202, and the secondary coil element 216 may be wound around the primary coil element 214 (e.g., with or without intra-wrapped insulating tape layers). As would be evident to one of ordinary skill in the art in light of the present disclosure, the method by which the primary coil element 214 and the secondary coil element 216 are wound around the bobbin tube 202 substantially impacts the operation of the sensor device 200. In particular, the number of turns (e.g., layers) of the primary coil element 214 and the secondary coil element 216 along a length of the bobbin tube may not only affect the physical dimensions of the sensor device (e.g., more turns equating to a larger cross-sectional area), but also the magnetic interaction between the probe assembly 102, the primary coil element 214, and the output signal of the secondary coil element 216.

Due to the nature of this magnetic interaction, failures to appropriately wind coil elements in a sensor (e.g., an LVDT sensor) may result in sensors that fail to achieve proper accuracy tolerances for use in their intended applications. Traditional sensors and associated winding methods, for example, often fail to maintain appropriate sensitivity values while simultaneously presenting large linearity errors. In particular, a conventional winding profile may refer to a sensor that includes a primary coil element having a uniform pitch (e.g., number of turns) along a length of the sensor. Such a primary coil element may appear substantially-uniform in thickness along the length of the sensor. In a conventional winding profile, however, two (2) or more secondary coil elements are wound along only a partial length of the sensor body also at a uniform pitch. In some instances, these two (2) secondary coil elements may only be wound half of the winding length (e.g., half of the length of the sensor). The use of such a conventional winding may produce a sensor having high linearity error (e.g., outside an acceptable threshold for linearity error).

As such, the embodiments of the present application provide for improved sensors in which a secondary coil element 216 is wound around the primary coil element 214 such that a pitch of the secondary coil element 216 varies according to a non-linear, polynomial function along a second length of the bobbin tube 202 so as to reduce linearity error of the sensor device 200. By way of example, in some embodiments, the primary coil element 214 may be wound along a first length of the bobbin tube 202 (e.g., extending some or all of the length of the bobbin tube 202) and may be wound at a pitch that is uniform along this first length. Said differently, in winding the primary coil element 214 around the bobbin tube 214, the turns may be uniform along the winding length (e.g., 2,000 turns per inch) such that the primary coil element 214 is consistent along the length of the sensor device 200. With regard to the secondary coil element 216, however, the pitch (e.g., turns/layers length) may vary according to a non-linear, polynomial function. The equation below, for example, may be used in some embodiments for winding the secondary coil element 216.

$$\text{No. of Turns} = C_0 + C_1 \times X + C_2 \times X^2 + \ldots C_n \times X^n$$

Wherein, the co-efficient of the constant function ($C_0$) is used modify the sum voltage. $C_0 \, \alpha$ Sum Voltage.

Wherein, the co-efficient of the linear function ($C_1$) is used modify the sensitivity. $-C_1 \, \alpha$ Sensitivity.

Wherein, the co-efficient of the non-linear functions ($C_2$, $C_3$, ... $C_n$) are used modify the linearity error based on non-linearity induced in output by magnetic saturation, material properties and/or winding geometry.

Figure 6:
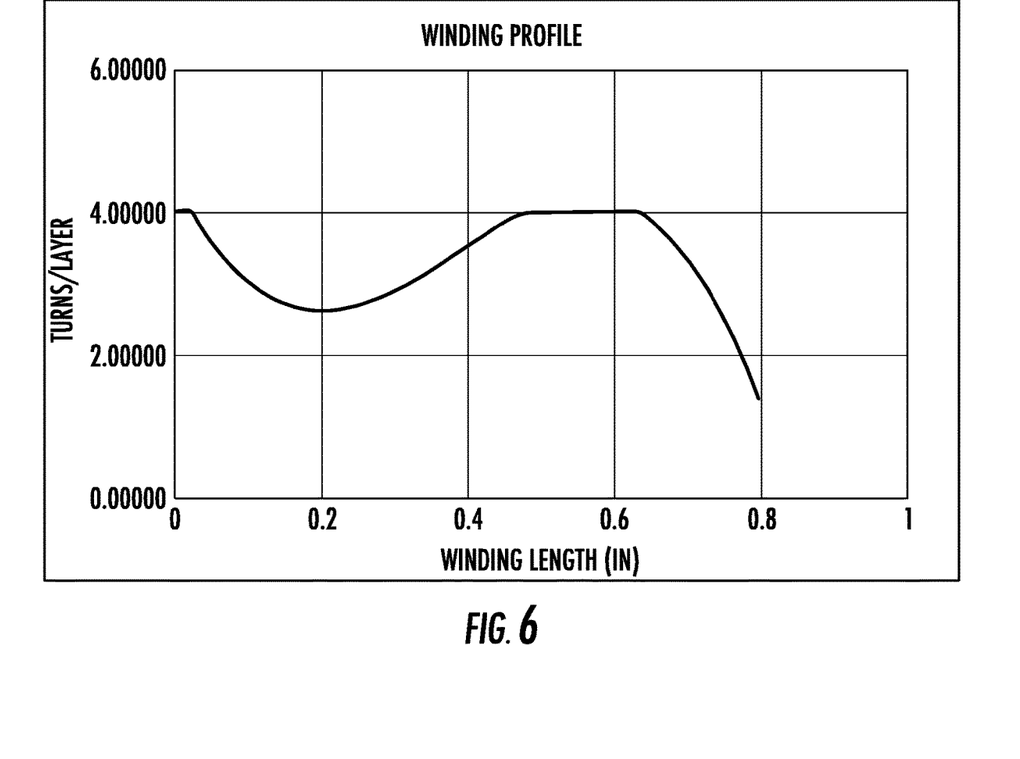
FIG. 6 is an example non-linear, polynomial winding method according to an example embodiment.

By way of particular example, FIG. 6 illustrates an example non-linear, polynomial winding profile according to the present disclosure. As shown, in some embodiments, the secondary coil element 216 may be wound such that the pitch or turns/layer vary along the winding length as illustrated in FIG. 6. The winding length for the secondary coil element 216 may extend a second length of the bobbin tube 202 and/or sensor device 200. In some instances, the first length of the primary coil element 214 and the second length of the secondary coil element 216 may be equal. In other instances, the secondary coil element 216 may be only wound along a portion of the bobbin tube 202 such that the second length may be less than the first length.

In some embodiments, the secondary coil element 216 may be wound so as to define a plurality of winding sections. Said differently, the second length (e.g., winding length) of the secondary coil element 216 may be divided into sections where the pitch of each winding section of the secondary coil element 216 varies according to the non-linear, polynomial function along its respective length of the bobbin tube 202. As the number of winding sections increases, the time required to analyze the winding profile (e.g., as illustrated hereafter in FIG. 11) increases due to the increased number of calculations. As the number of winding sections employed to wind the secondary coil element 216 increases, however, the resolution (e.g., granularity by which to adjust the winding profile) increases. In this way, some portions of the winding sections may be defined as a coil transition portion (e.g., the portion at which two winding sections contact). By increasing the number of winding sections and associated locations between winding sections (e.g., coil transition portions), the pitch variability between adjacent winding sections may be minimized. Said differently, increasing the number of winding sections and associated coil transition portions increases the smoothness of the winding profile of the secondary coil element 216. In contrast, traditional winding methods, such as the conventional winding method described above, may be stepped such that abrupt changes in pitch occur between sections. These abrupt changes, as opposed to the smooth transitions described above, results in decreased performance in traditional sensor devices.

Figure 7:
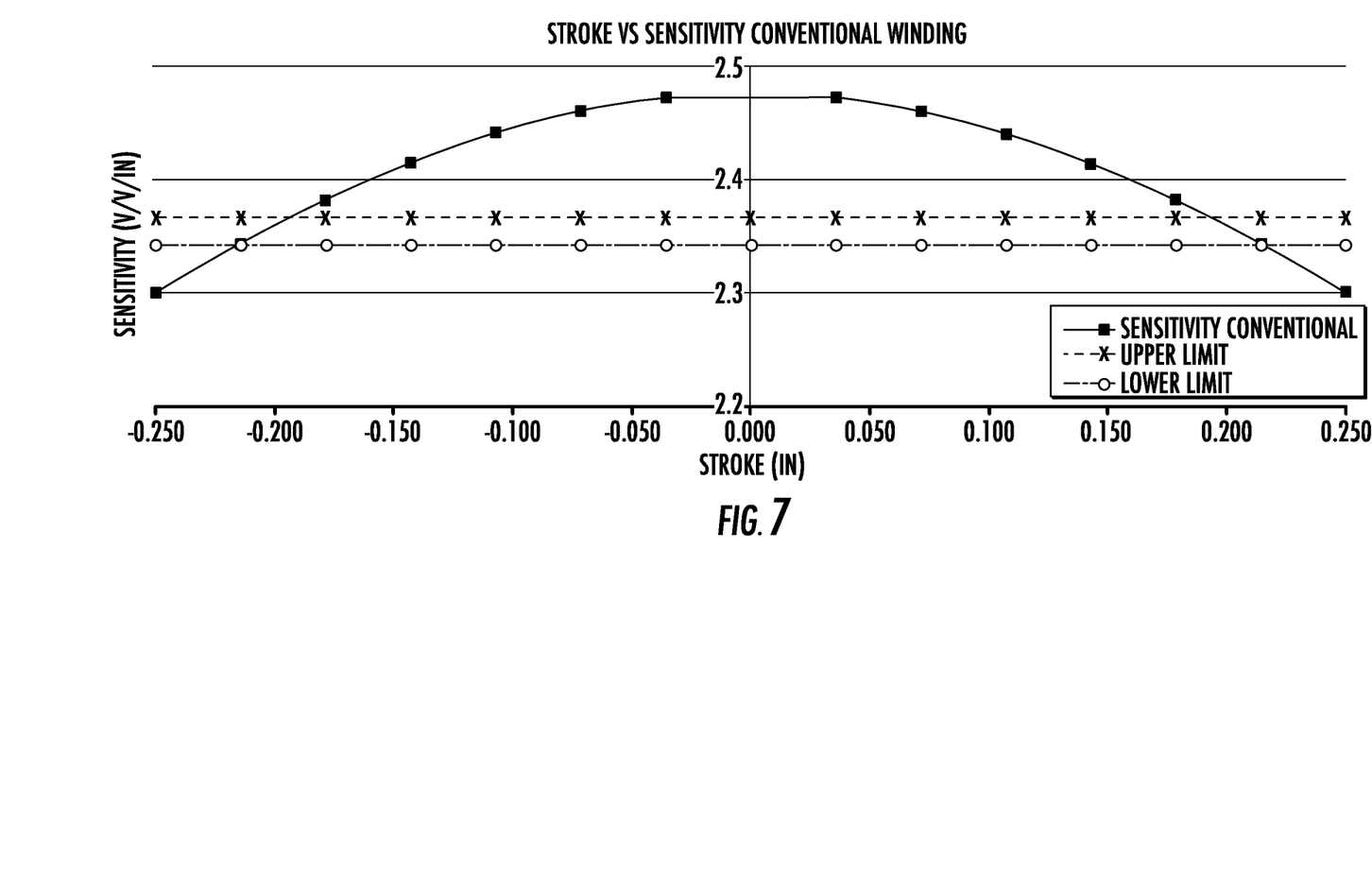
FIG. 7 is an example plot of stroke vs. sensitivity for conventional winding methods.
Figure 8:
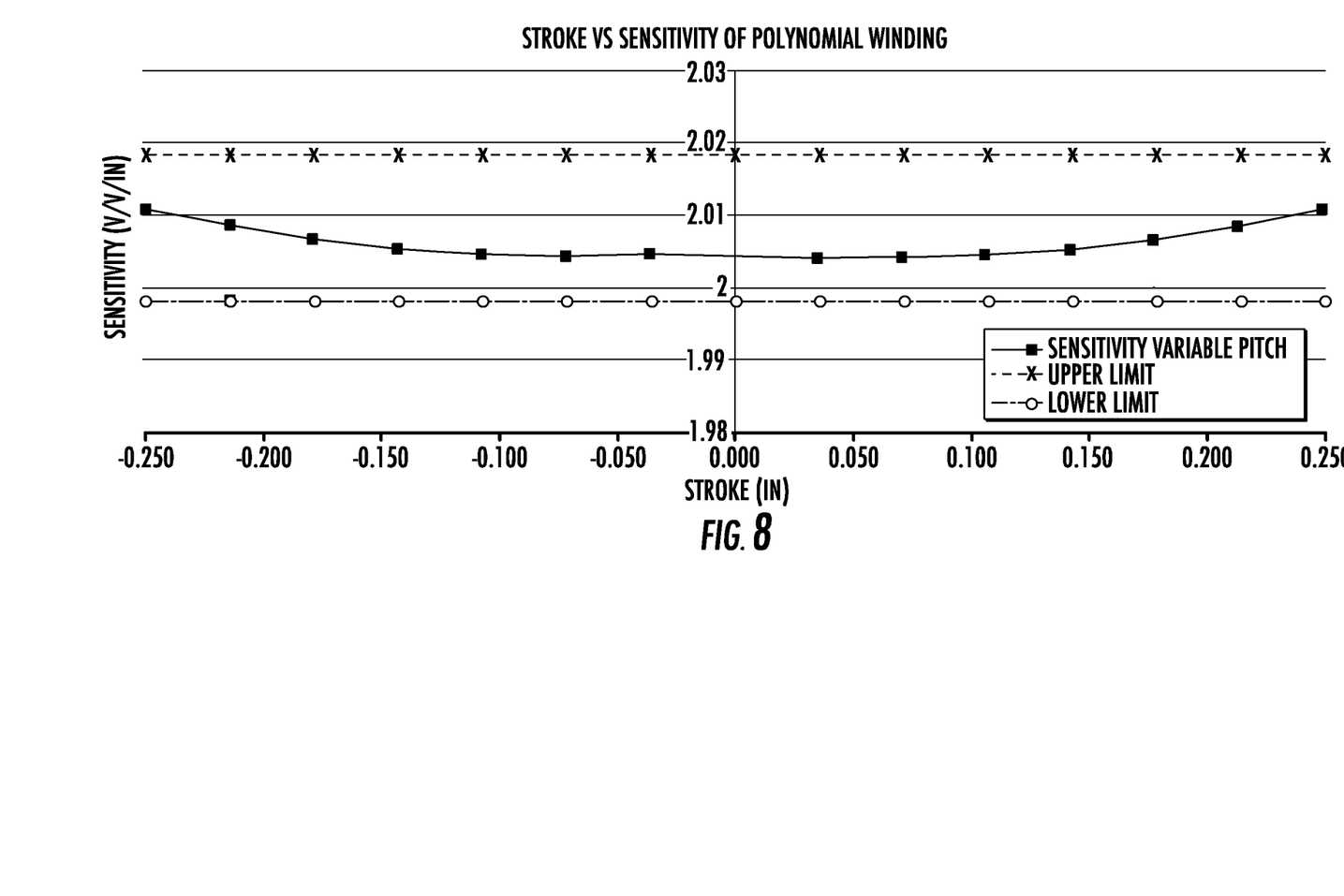
FIG. 8 is an example plot of stroke vs. sensitivity for non-linear, polynomial winding according to an example.

Turning now to FIGS. 7-11, various plots regarding the performance of traditional winding methods and the improved performance of the non-linear, polynomial winding of the present application are illustrated. With reference to FIG. 7, a plot of stroke (e.g., distance traveled by the probe assembly's 102 core within the bobbin tube 202) vs. sensitivity for a conventional winding profile is illustrated. Upper and lower limits for the accepted sensitivity values (e.g., sensitivity thresholds) are also illustrated. With conventional winding techniques, the sensitivity of these traditional devices fails to meet the sensitivity requirements at each stroke in order to reliably operate. With reference to FIG. 8, however, the stroke vs. sensitivity for the non-linear, polynomial winding of the present application is illustrated. As shown, the sensitivity for the winding profiles described herein satisfy the relevant sensitivity thresholds for all strokes.

Figure 9:
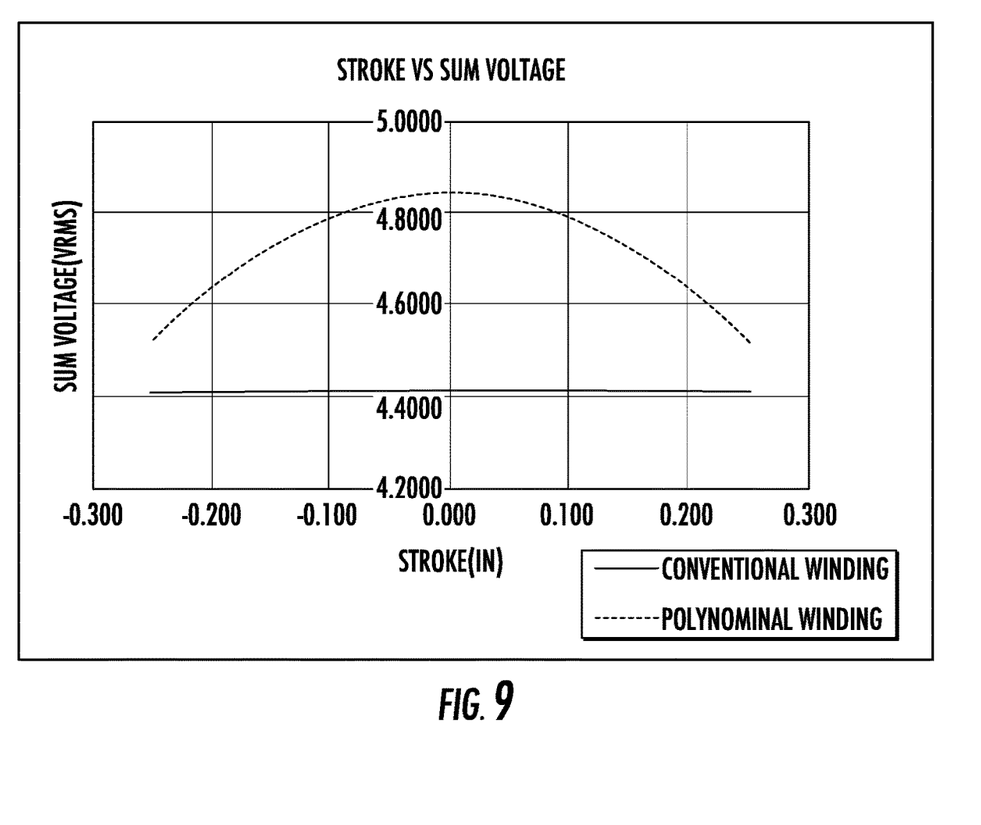
FIG. 9 is an example plot of stroke vs. sum voltage for conventional winding and non-linear, polynomial winding.

With reference to FIG. 9, a plot of the stroke vs. sum voltage for an example conventional winding and an example non-linear, polynomial winding of the present application are illustrated. As would be evident to one of ordinary skill in the art in light of the present disclosure, adjustment of the sum voltage allows for direct regulation of both sensitivity and linearity in specific sections of the LVDT stroke.

Figure 10:
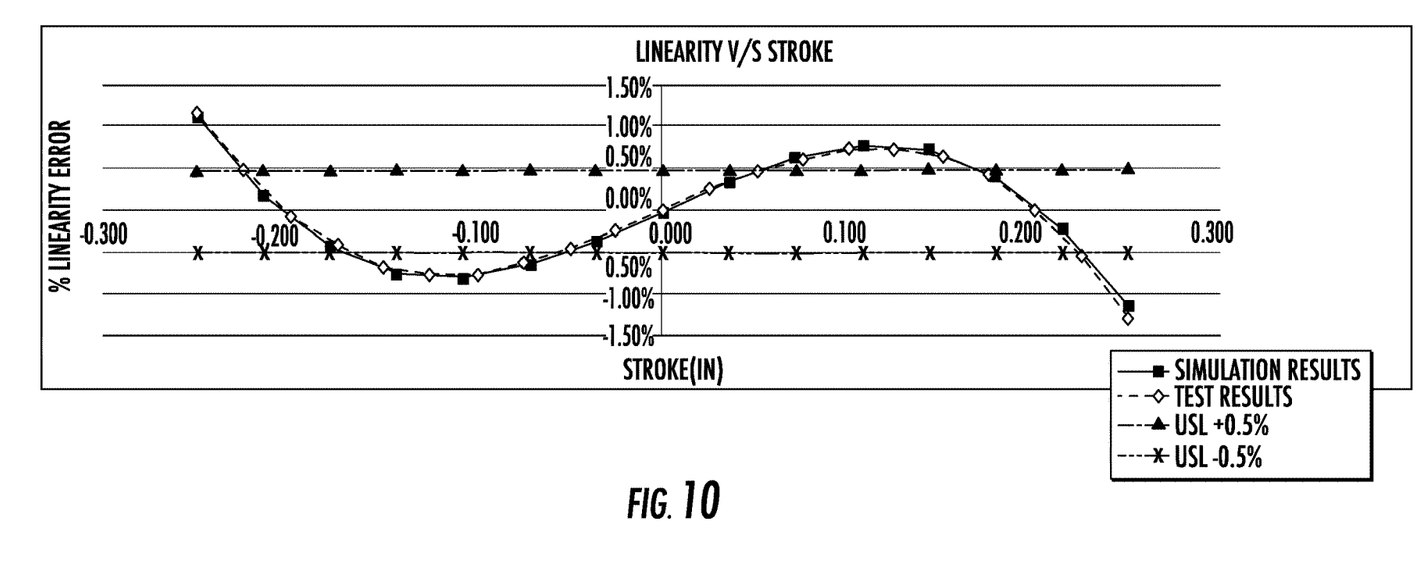
FIG. 10 is an example plot of linearity error vs. stroke for conventional winding.
Figure 11:
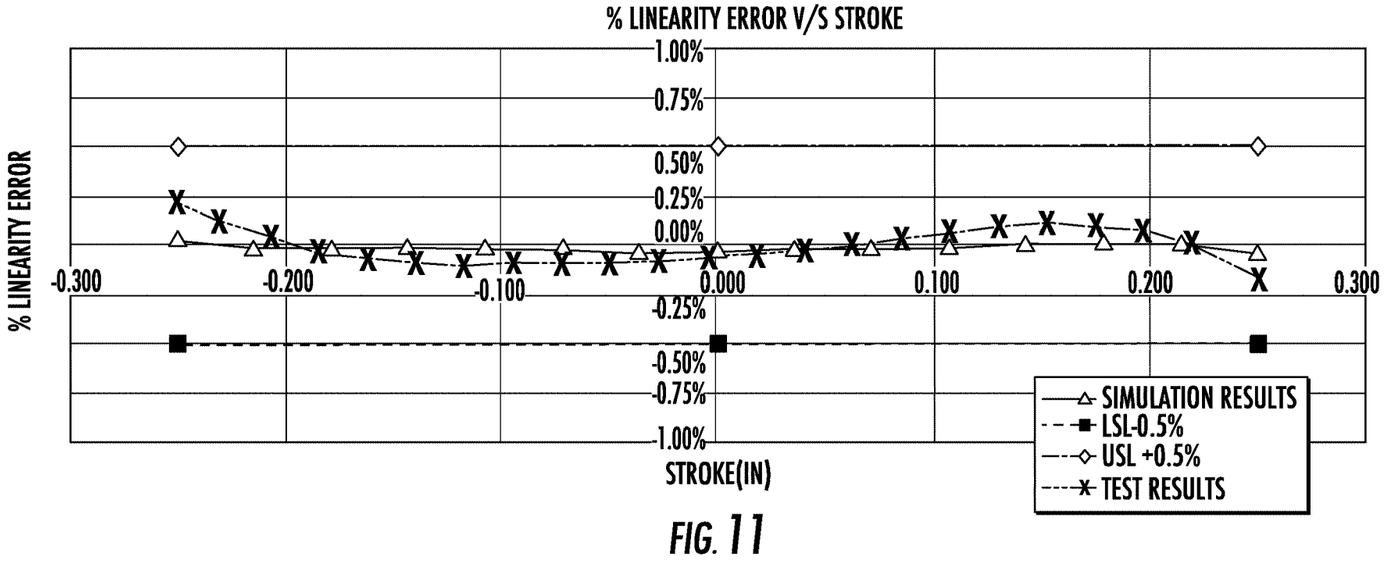
FIG. 11 is an example plot of linearity error vs. stroke for non-linear, polynomial winding according to an example.

With reference to FIG. 10, the linearity error % vs. stroke for a conventional winding method is illustrated. As shown, the linearity error % for the conventional winding profile displays high variability that exceeds the linearity error % thresholds for example LVDT sensors. As such, the reliability and effectiveness of these conventionally wound sensors is greatly reduced. In contrast, FIG. 11 illustrates the linearity error % vs. stroke for an example non-linear, polynomial winding according to the present disclosure. As shown, the linearity error % for the winding methods of the present application are greatly reduced (e.g., constrained by the applicable thresholds) such that the sensor devices of the present application provide improved reliability and accuracy as compared to traditional devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sensor device for converting between motion and electrical signals, the sensor device comprising:
 a bobbin tube, wherein the bobbin tube defines a hollow interior;
 a primary coil element wound around the bobbin tube, wherein the primary coil element is configured to, in response to a current input, generate a primary magnetic flux; and
 a secondary coil element wound around the primary coil element, wherein, in an instance in which the bobbin tube receives a probe assembly therein, magnetic interaction between the probe assembly and the primary coil element is configured to induce a signal in the secondary coil element, and wherein a pitch of the secondary coil element varies according to a non-linear, polynomial function along a second length of the bobbin tube.

2. The sensor device according to claim 1, wherein a pitch of the primary coil element is uniform along a first length of the bobbin tube.

3. The sensor device according to claim 2, wherein the first length and the second length are equal.

4. The sensor device according to claim 1, wherein the secondary coil element further defines a plurality of winding sections, wherein the pitch of each winding section of the secondary coil element varies according to the non-linear, polynomial function along its respective length of the bobbin tube.

5. The sensor device according to claim 4, wherein the secondary coil element further defines a plurality of coil transition portions between winding sections.

6. The sensor device according to claim 5, wherein each coil transition portion is configured to minimize pitch variability between adjacent winding sections.

7. The sensor device according to claim 1, further comprising one or more insulating tape layers wrapped around the secondary coil element.

8. The sensor device according to claim 1, further comprising one or more wires operably coupled to the primary coil element and configured to provide the current input to the primary coil element.

9. The sensor device according to claim 1, wherein the signal in the secondary coil element indicates a relative movement of the probe assembly within the bobbin tube.

10. A method of assembling a sensor device for converting between motion and electrical signals, the method comprising:
 providing a bobbin tube, wherein the bobbin tube defines a hollow interior;
 winding a primary coil element around the bobbin tube, wherein the primary coil element is configured to, in response to a current input, generate a primary magnetic flux; and
 winding a secondary coil element around the primary coil element, wherein, in an instance in which the bobbin tube receives a probe assembly therein, magnetic interaction between the probe assembly and the primary coil element is configured to induce a signal in the secondary coil element, and wherein the secondary coil element is wound such that a pitch of the secondary coil element varies according to a non-linear, polynomial function along a second length of the bobbin tube so as to reduce linearity error of the sensor device.

11. The method according to claim 10, wherein the primary coil element is wound such that a pitch of the primary coil element is uniform along a first length of the bobbin tube.

12. The method according to claim 11, wherein the first length and the second length are equal.

13. The method according to claim 10, wherein winding the secondary coil element further comprises winding a plurality of winding sections, wherein the pitch of each winding section of the secondary coil element varies according to the non-linear, polynomial function along its respective length of the bobbin tube.

14. The method according to claim 13, wherein winding the secondary coil element further comprises winding a plurality of coil transition portions between winding sections.

15. The method according to claim 14, wherein each coil transition portion is configured to minimize pitch variability between adjacent winding sections.

16. The method according to claim 10, further comprising wrapping one or more insulating tape layers around the secondary coil element.

17. The method according to claim 10, further comprising coupling one or more wires to the primary coil element so as to provide the current input to the primary coil element.

18. The method according to claim 10, wherein the signal in the secondary coil element indicates a relative movement of the probe assembly within the bobbin tube.

19. A sensor assembly comprising:
- a bobbin tube, wherein the bobbin tube defines a hollow interior;
- a probe assembly, wherein the probe assembly is inserted within the hollow interior of the bobbin tube;
- a primary coil element wound around the bobbin tube, wherein the primary coil element is configured to, in response to a current input, generate a primary magnetic flux;
- and a secondary coil element wound around the primary coil element, wherein the sensor assembly is configured such that magnetic interaction between the probe assembly and the primary coil element induces a signal in the secondary coil element indicating a relative movement of the probe assembly within the bobbin tube, and wherein a pitch of the secondary coil element varies according to a non-linear, polynomial function along a second length of the bobbin tube so as to reduce linearity error of the sensor assembly.

20. The sensor assembly according to claim 19, wherein the secondary coil element further defines a plurality of winding sections, wherein each winding section of the secondary coil element is wound according to the non-linear, polynomial function along its respective length of the bobbin tube.

* * * * *